United States Patent [19]

Caledonia et al.

[11] Patent Number: 4,894,511

[45] Date of Patent: Jan. 16, 1990

[54] SOURCE OF HIGH FLUX ENERGETIC ATOMS

[75] Inventors: George E. Caledonia, Milton; Robert H. Krech, Saugus; Byron D. Green, Reading; Anthony N. Pirri, Andover, all of Mass.

[73] Assignee: Physical Sciences, Inc., Andover, Mass.

[21] Appl. No.: 900,616

[22] Filed: Aug. 26, 1986

[51] Int. Cl.$^4$ .................................................. B23K 9/00

[52] U.S. Cl. .......................... 219/121.52; 219/121.59; 219/121.84; 219/121.6; 219/121.85; 219/121.55; 250/423 P; 60/203.1

[58] Field of Search ................. 219/121 EB, 121 EM, 219/121 FS, 121.55, 121 L, 121 LG, 121 LM, 121 P, 121 PY, 121 PG; 60/203.1, 514; 427/53; 250/423 P; 204/192, 157.41, 155, 157.22

[56] References Cited

U.S. PATENT DOCUMENTS

| | | | |
|---|---|---|---|
| 2,883,568 | 4/1959 | Beam et al. | 313/7 |
| 3,300,000 | 1/1967 | Stoyke | 192/.09 |
| 3,492,074 | 1/1970 | Rending | 356/35 |
| 3,723,246 | 3/1973 | Lubin | 219/121 FS |
| 3,877,334 | 4/1975 | Gerber | 83/22 |
| 3,935,504 | 1/1976 | Guillaneux et al. | 219/121 PY |
| 3,992,685 | 11/1976 | Ogren et al. | 331/94.5 |
| 4,001,136 | 1/1977 | Channell et al. | 252/187 R |
| 4,036,012 | 7/1977 | Monsler | 60/203 |
| 4,076,606 | 2/1978 | Suzuki et al. | 204/157 R |
| 4,091,256 | 5/1978 | Friichtenicht | 219/121 P |
| 4,099,140 | 7/1978 | Snelling et al. | 331/94.5 |
| 4,102,950 | 7/1978 | Pilipovich et al. | 423/579 |
| 4,119,509 | 10/1978 | Szoke | 204/157.1 R |
| 4,129,772 | 12/1978 | Navratil et al. | 219/121 P |
| 4,145,668 | 3/1979 | Mastrup et al. | 331/94.5 P |
| 4,155,722 | 5/1979 | Lehmann | 55/2 |
| 4,182,663 | 1/1980 | Vaseen | 204/157.1 R |
| 4,199,419 | 4/1980 | Holroyd et al. | 204/157.1 R |
| 4,208,129 | 6/1980 | Spenser | 356/425 |
| 4,214,962 | 7/1980 | Pincon | 204/157.1 R |
| 4,252,623 | 2/1981 | Vaseen | 204/157.1 R |
| 4,299,860 | 11/1981 | Schaefer et al. | 427/53.1 |
| 4,327,338 | 4/1982 | Roberts | 372/89 |
| 4,331,856 | 5/1982 | D'Antonio | 219/121 P |
| 4,360,923 | 11/1982 | Thayer, III et al. | 372/89 |
| 4,426,843 | 1/1984 | Fowler et al. | 60/203.1 |
| 4,427,636 | 1/1984 | Obenshain | 422/186.07 |
| 4,514,698 | 4/1985 | Blumenthal et al. | 330/4.3 |
| 4,522,674 | 6/1985 | Ninomiya et al. | 156/345 |
| 4,527,044 | 7/1985 | Bruel et al. | 219/121 P |
| 4,536,252 | 8/1985 | McDonald et al. | 156/662 |

OTHER PUBLICATIONS

"High Kinetic Energy (1-10eV) Laser Sustained Neutral Atom Beam Source"; Jon B. Cross and David A. Cremers; Nuclear Instruments and Methods in Physics Research, vol. 13B, No. 1/3, Mar. 1986, pp. 658-662, Elsevier Science Pub.

"Review of Gas-Breakdown Phenomena Induced by High-Power Lasers-I*"; I. P. Shkarofsky; RCA Limited, Ste. Anne de Bellevue, Quebec, vol. 35, Mar. 1974, pp. 48-78.

AIAA Shuttle Environment and Operations II Conference, American Institute of Aeronautics and Astronautics pp. 153-159, 11/13-15/85.

*Primary Examiner*—M. H. Paschall

*Attorney, Agent, or Firm*—Weingarten, Schurgin, Gagnebin & Hayes

[57] ABSTRACT

Method and apparatus for generating a nearly monoenergetic beam of atoms at velocities on the order of several km/sec (energies of 1-10 eV) and for achieving modification of the surface properties of a target by the beam, including surface erosion, reaction with the beam species, cleaning and coating, all over a large area. A gas or gas mixture is forced through a nozzle throat into a previously evacuated expansion nozzle resulting in the acceleration of the gas in a confined flow. Laser radiation is applied to the gas flow to cause breakdown and dissociation of the gas into an atomic plasma. The plasma is allowed to expand within the nozzle cone reaching a high velocity in the desired range. The beam is generated within a vacuum chamber to maintain the purity of the gas components and prevent collisional effects. The beam is used to modify the properties of a target material placed in the path of its flow and its atoms may react with surface components to form a molecular coating. By applying the gas in pulses, controlled thin layering, even to the extent of a single atom thickness, is possible.

36 Claims, 1 Drawing Sheet

SOURCE OF HIGH FLUX ENERGETIC ATOMS

FIELD AND BACKGROUND

In the NASA Space Shuttle flights, degradation of the surfaces of several of the Shuttle components has been noticed during the craft's low orbital circlings of the earth. These have been theorized to result from the impact with atomic particles, largely oxygen atoms which occur at those altitudes at orbital speeds of 8.0 km/sec. It was found that the degree of deterioration was of a nature that demands testing of the material in a simulated environment.

Simulating the conditions of high velocity atoms found in the low orbit path of the Shuttle is beyond the state of the art of present technology due to the difficulty of achieving such high speeds in a decomposed gas or particle beam at high particle fluxes.

BRIEF SUMMARY

A high flux, nearly mono-energetic beam of atomic particles is achieved by forcing a gas containing the material of which the beam is to be formed through a nozzle throat into a confined and narrow, expanding flow column within a vacuum chamber evacuated to a very low pressure. The column is irradiated to cause breakdown and dissociation of the expanding gas, generating a plasma. The expanding plasma is allowed to achieve very high velocities for the plasma components. The cooling of the expansion allows the plasma to charge neutralize with the formation of neutral atomic particles in the beam, but the densities are typically kept low enough to prevent reformation of any gas molecules.

In typical implementation, the gas, or gas mixture, is forced through the nozzle throat in pulses using a molecular valve. Very shortly after the initial ejection of the gas through the nozzle, into its conical throat, a pulse of high power laser radiation is focused into the ejected gas. Sufficient energy is applied given the molecular density of the gas in the nozzle to produce breakdown and dissociation of the gas into a very hot plasma. The plasma energy in turn drives an expansion of the plasma which is guided outward by the nozzle walls to the nozzle exit producing an exit gas with a very high, and substantially uniform velocity in the range of one to ten km/sec. A target of a material whose surface is to be modified intercepts the flow of the atoms. Depending upon the atom and target material, various effects can be achieved from the atomic bombardment including surface erosion, surface coating, reaction of the atoms in the bombarding beam with target material and surface cleaning or decontamination.

Among the gases for which the invention is particularly adapted for use in the creation of a high velocity particle beam are the stable diatomics, oxygen, hydrogen, nitrogen, fluorine, and chlorine. Other stable gases such as carbon monoxide, hydrogen cloride and many hydrocarbons can also be used as Precursors to the atomic particle beam.

Many other atomic species, such as metals or refractory elements may also be generated by this technique, by producing a laser breakdown in gas mixtures species such as metal carbonyls, organometalics, $SiH_4$, metal halides etc. can be used to produce extremely thin metallic or refractory coatings on substrates useful in the semiconductor fabrication and in other applications.

DESCRIPTION OF THE DRAWING

These and other features of the invention are described below in the solely exemplary detailed description and accompanying drawing of which.

DETAILED DESCRIPTION

The present invention contemplates the generation of high velocity atomic beams of diverse particle types and the application of those beams to produce a modification of the surface of a selected target material.

Figure 1:
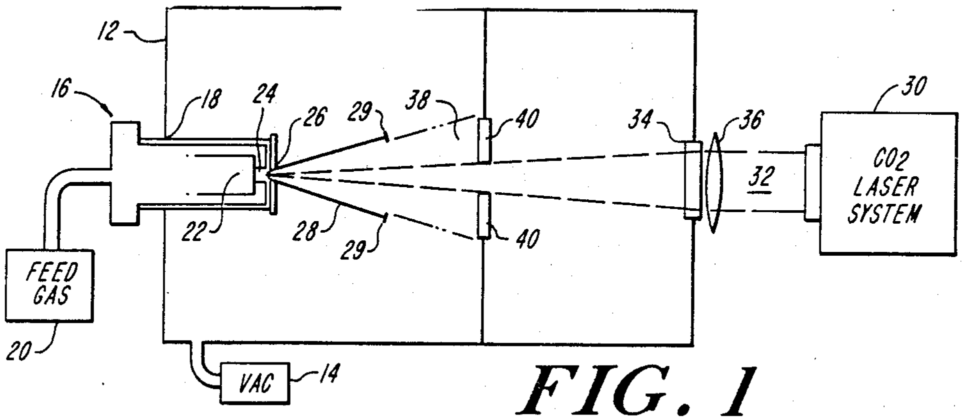
FIG. 1 is a schematic view of apparatus for performing the invention.

Apparatus for practicing the invention is illustrated with respect to FIG. 1 which shows a vacuum chamber 12 evacuated by a pump system 14 to a low pressure, typically in the range of $10^{-7}$ atmospheres or less to avoid contaminants in the beam generation process. Observation and access ports may be installed on the vacuum chamber as desired as is conventional in the art of vacuum processing.

A nozzle assembly 16 extends into the chamber 12 through a sealed port 18. A gas or mixture of gases is applied to the nozzle assembly 16 from a feed source 20 at an appropriate pressure, typically several atmospheres. It is useful to apply the gas to the interior of a chamber 12 through a pulsed delivery system in order to permit more control over surface effects, enabling a mono-atomic layer to be produced and to limit the requirements placed upon the vacuum pump 14. Continuous operation is possible as well. In one embodiment, the valving for pulsed application of the gas is accomplished by use of a molecular valve 22 which may be a model BV-100 pulsed molecular beam valve manufactured by Newport Research. This valve is capable of providing gas bursts as short a 100 microseconds in duration. Short duration bursts are useful because the number of atoms is limited, allowing finer control of the target surface modification effects and reducing the pumping load necessary to maintain the desired vacuum.

The molecular valve 22 transfers each burst of gas through a $\frac{1}{8}$ inch O-ring 24 and 1.0 mm aperture in a face plate 26 to a nozzle cone or throat 28, typically provided with a 20° expansion angle and 10 cm length. This permits a narrow column of gas, typically 1.0 mm in diameter, to be ejected into the chamber 12 with each burst.

A laser system 30 is provided as a source of radiant energy for producing breakdown and dissociation of the gas exiting from the aperture in the face plate 26. The laser system 30 is typically a carbon dioxide laser operating at the 10.6 micron wavelength although other wavelengths are possible. The laser system is capable of providing short duration pulses, 2.5 microseconds being typical, at approximately 5–10 Joules of energy each. The length and energy of the pulse is a function of the need to achieve a very rapid expansion with a limited number of gas atoms in each gas burst, thereby to drive the very high velocity output beam of atoms. For a given terminal velocity the required pulse energy is directly proportional to the amount of gas processed.

The laser system 30 generates a pulsed output beam 32 which enters the chamber 12 through a sodium chloride window 34 and is focused by a lens 36 to achieve a narrow waist size, typically 0.1 mm diameter, at the apex of the throat 28 where the aperture in the face plate 26 ejects the gas into the nozzle. The high energy, short duration pulse creates a breakdown of the gas forming a plasma. The required intensity to achieve breakdown is a function of both processed gas identity and pressure. The ultra high temperatures in the resulting plasma in combination with the vacuum environment produces a plasma expansion 38 confined by the throat walls that achieves a nearly mono-energetic gas flow with velocities that reach the range of 1–10 km/sec at the nozzle exit.

Figure 3:
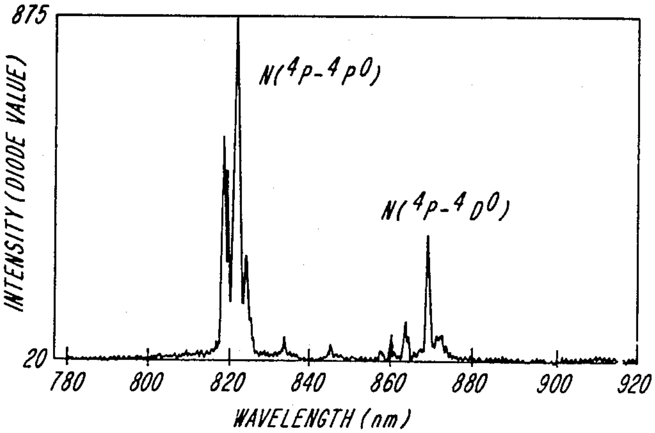
FIG. 3 is a radiation spectrum of a nitrogen beam produced according to the invention.

FIG. 3 illustrates a spectrum of a beam of nitrogen atoms developed according to the invention. The plasma expansion 38 cools to produce a nearly mono-energetic or uniform velocity flow of atoms.

Targets 40 are placed in the path of the expansion 30 for surface modification including material coating and thin film production according to the desires of the operator. The target 40 may be placed off axis from the laser beam 32. The actively affected area of target 40 maybe as large as 100 $cm^2$, or larger. The application of the invention is not limited to any specific target material. Nor is there a limit to the type of atomic species that ca be generated in the expansion beam 38. Conventional and stable diatomic homonuclear gases such as oxygen, hydrogen, nitrogen, fluorine, and chlorine as well as multi-element stable diatomic and larger gases can be used as the plasma precursor. In addition, it is possible to produce a beam of other species such as metals or refractory materials by applying a mixture of precursor gases from the feed system 20, for example, a combination of a rare earth gas with a metallic carbonyl, organometalic, $SiH_4$, or metal halide among others. The applied plasma may react with the target 40 producing, in the case of a carbonyl feed component, SiC or TiC, using silicon or titanium in the feed gas as well. The high plasma temperature allows cool or room target operation temperature.

Figure 2:
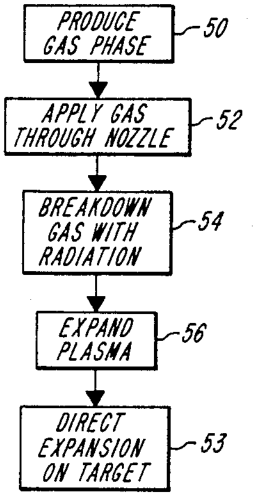
FIG. 2 is a process diagram illustrating the method of the invention.

The process of the invention is illustrated with respect to FIG. 2 in which a gas of a desired element or mixture of mono-or multi-element gases is produced in a step 50. This gas is applied through a nozzle such as represented by the nozzle system 16 in a step 52, being ejected into the throat region of an expansion cone. The thus ejected gas is broken down in a step 54, typically by use of radiant energy, creating a hot, pressurized plasma. This plasma is allowed to expand in the desired direction as established by the nozzle walls in a step 56 and directed toward an appropriate target in a step 58.

The following example will serve to illustrate a specific case of the use of the present invention in the generation of a high velocity atom beam.

EXAMPLE 1

Oxygen at approximately $6\frac{1}{3}$ atmospheres is applied from the gas feed system 20 to the nozzle where the molecular valve produces repetitive bursts of gas having a controlled duration of up to 1.0 milliseconds. Typically, after the first 200 microseconds of gas ejection into the throat, a 2.5 microsecond burst of laser radiation of wavelength 10.6 $\mu$m is focussed to a 0.1 mm waist at the apex of the nozzle throat. The vacuum chamber is maintained in the range of $3\times10^{-5}$ to $10^{-4}$ torr during the process. Atomic oxygen flow rates of 9–10 km/sec were deduced from instrumentation applied to the chamber 12.

Targets of polyethylene and aluminum were placed to intercept the flow of the atomic beam and exposed to hundreds of cycles of this atomic oxygen treatment. The results showed clear evidence of material erosion. Scanning electron microscope analysis of a polyethylene target exposed to the oxygen beam showed an oxygen surface enrichment, while target areas beyond the beam showed no enhancement. Spectral analysis of an irradiated aluminum target showed a spectral signature characteristic, in part, of the irradiating beam.

The present invention thus provides a source of high velocity atoms of diverse types and capable of providing surface modification of various target materials. The scope of the invention is to be found only within the following claims.

What is claimed:

1. Apparatus for generating a nearly mono-energetic, high flux beam of high velocity atomic gas particles comprising:

a vacuum chamber;

nozzle means within the vacuum chamber for ejecting a confined flow of a gas into a narrow aperture;

means for causing breakdown of the gas flow into a plasma within the narrow aperture;

means for accommodating volumetric expansion of the plasma to produce a high velocity nearly mono-energetic atomic beam.

2. The apparatus of claim 1 wherein said vacuum chamber includes means for maintaining a pressure of approximately $10^{-4}$ torr or less.

3. The apparatus of claim 1 wherein said nozzle includes means for providing said narrow aperture of approximately 1.0 mm diameter.

4. The apparatus of claim 1 wherein said nozzle includes means for causing pulsed ejection of the confined flow.

5. The apparatus of claim 4 wherein said pulsed ejection causing means includes a pulsed molecular beam valve.

6. The apparatus of claim 4 wherein said means for causing pulsed ejection provides ejection pulses of duration measured in one hundred to several hundreds of microseconds.

7. The apparatus of claim 1 wherein said means for causing breakdown includes means for generating radiant energy.

8. The apparatus of claim 7 wherein said means for generating radiant energy includes means for generating pulsed radiation.

9. The apparatus of claim 7 wherein said means for generating radiant energy includes a laser.

10. The apparatus of claim 9 wherein said laser includes a $CO_2$ laser.

11. The apparatus of claim 7 wherein said means for generating radiant energy includes means for applying the radiant energy to a portion of a region of the volumetric expansion of the plasma.

12. The apparatus of claim 1 wherein the means for accommodating expansion includes a nozzle cone.

13. The apparatus of claim 1 further including means for positioning a target in the path of the flow to produce surface modification of the target material.

14. The apparatus of claim 13 wherein a target is provided in the positioning means.

15. The apparatus of claim 14 wherein said means for causing breakdown includes a laser beam and said target is positioned off axis from said laser beam.

16. The apparatus of claim 1 further comprising means for causing the gas to flow to said nozzle means and wherein said gas is selected from the group of diatomic mononuclear and diatomic and larger gases, and mixtures of gas precursors to metals and refractory materials.

17. The apparatus of claim 16 wherein said gas is further selected from the group consisting of a mixture of a rare earth gas with a metallic carbonyl, organometalic, silicon compounds, hydroxide and metal halide.

18. A method for generating a nearly mono-energetic beam of high velocity high flux atomic gas particles within a vacuum chamber comprising:

ejecting a confined flow of a gas into a narrow aperture by way of a nozzle within the vacuum chamber;

causing breakdown of the gas flow into a plasma within the narrow aperture;

producing volumetric expansion of the plasma to produce a high velocity nearly mono-energetic atomic beam.

19. The methods of claim 18 further including the step of maintaining a pressure of approximately $10^{-4}$ torr or less within the vacuum chamber.

20. The method of claim 18 wherein said ejecting step includes the step of providing said narrow aperture of approximately 1.0 mm diameter.

21. The method of claim 18 wherein said ejecting step includes the step of causing pulsed ejection of the confined flow.

22. The method of claim 21 wherein said pulsed ejection causing step includes the step of molecular valving.

23. The method of claim 18 wherein said step of causing pulsed ejection provides ejection pulses of duration measured in one hundred to several hundreds of microseconds.

24. The method of claim 18 wherein said step of causing breakdown includes the step of generating radiant energy.

25. The method of claim 24 wherein said step of generating radiant energy includes the step of generating pulsed radiation.

26. The method of claim 24 wherein said step of generating radiant energy includes the step of laser radiation generation.

27. The method of claim 24 wherein said step of generating radiant energy includes the step of applying the radiant energy to a portion of a region of the volumetric expansion of the plasma.

28. The method of claim 18 wherein the step of producing expansion includes the step of guiding the expansion by a nozzle cone.

29. The method of claim 18 further including the step of positioning a target in the path of the flow to produce surface modification of the target material.

30. The method of claim 18 wherein step of producing expansion includes the step of charge neutralizing the plasma.

31. The method of claim 18 wherein the ejecting step includes the step of ejecting a gas selected from the group consisting of oxygen, hydrogen, nitrogen, flourine, chlorine, carbon monoxide, and mixtures of a rare earth gas with a metal carbonyl, organometalic, $SiH_4$, and metal halide.

32. A target treated for surface modification in accordance with the method of claim 29.

33. The method of claim 29 wherein said surface modification step includes the step of coating the target surface.

34. A target treated for surface modification in accordance with the method of claim 33.

35. The method of claim 29 wherein said surface modification step includes the step of producing a thin film on said target.

36. A target treated for surface modification in accordance with the method of claim 35.

* * * * *

UNITED STATES PATENT AND TRADEMARK OFFICE
CERTIFICATE OF CORRECTION

PATENT NO. : 4,894,511

DATED : January 16, 1990

INVENTOR(S) : George E. Caledonia, Robert H. Krech, Byron D. Green, Anthony N. Pirri

It is certified that error appears in the above-identified patent and that said Letters Patent is hereby corrected as shown below:

Column 1, before "Field and Background", insert --This invention was made with Government support under Contract No. NAS-7-938 with the National Aeronautics Space Administration and the United States Government has certain rights thereto.--.

Column 1, line 61, "cloride" should read --chloride--.

Column 1, line 62, "Precursors" should read --precursors--.

Column 2, line 42, "a 100" should read --as 100--.

Column 3, line 25, "maybe " should read -- may be--.

Column 3, line 28, "ca be" should read --can be--.

Column 6, lines 25-26, "flou-rine" should read --fluo-rine--.

Signed and Sealed this

Twenty-third Day of June, 1992

*Attest:*

DOUGLAS B. COMER

*Attesting Officer* *Acting Commissioner of Patents and Trademarks*